(12) United States Patent
Nakamae et al.

(10) Patent No.: US 7,438,348 B2
(45) Date of Patent: Oct. 21, 2008

(54) VEHICLE FRONT STRUCTURE

(75) Inventors: Takayuki Nakamae, Fuchu-cho (JP);
Yasunori Kageyama, Fuchu-cho (JP);
Nobuyuki Nakayama, Fuchu-cho (JP);
Takayuki Sunakawa, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/902,051

(22) Filed: Sep. 18, 2007

(65) Prior Publication Data

US 2008/0067838 A1 Mar. 20, 2008

(30) Foreign Application Priority Data

Sep. 19, 2006 (JP) .............................. 2006-252780

(51) Int. Cl.
*B60K 11/04* (2006.01)
*B60J 7/00* (2006.01)
(52) U.S. Cl. ............................ 296/187.04; 296/187.09; 296/193.09; 180/68.6; 293/115
(58) Field of Classification Search ............ 296/193.09, 296/193.1, 203.02, 187.04, 187.09; 293/115; 180/68.6
See application file for complete search history.

(56) References Cited

FOREIGN PATENT DOCUMENTS

JP 2005-271810 6/2005
JP 2006-001358 5/2006

*Primary Examiner*—Joseph D Pape

(57) ABSTRACT

Disclosed is a vehicle front structure, which comprises a bumper fascia 2, a lower shroud member 3b, a subframe 5 including a first shock-absorbing module 7, and a second shock-absorbing module 10 having a stiffness less than that of the first shock-absorbing module 7. A subframe body 6 is formed in an approximately rectangular shape and disposed on a rear side of the lower shroud member 3b. The first shock-absorbing module 7 includes an energy-absorbing section 8, 8 and a beam member 9. The energy-absorbing section 8, 8 has a configuration which extends frontwardly from respective front end regions of the subframe body 6 located on laterally-opposite sides thereof, along respective opposite lateral surfaces of the lower shroud member 3b, and the beam member 9 has a configuration bridging between respective front ends of the energy-absorbing section 8, 8, at a height position approximately equal to or adjacent to that of a lower edge of the lower shroud member 3b. The second shock-absorbing module 10 has a bulging portion 10a which covers at least a part of a front surface of the beam member 9. The vehicle front structure of the present invention can ensure sufficient pedestrian protection performance by means of enhancing impact energy-absorbing capacity, while achieving enhanced repairability in the event of a low-impact collision.

6 Claims, 9 Drawing Sheets

VEHICLE FRONT STRUCTURE

BACKGROUND OF THE INVENTION

1. Field of the Invention

The present invention relates to a vehicle front structure.

2. Background Art

Heretofore, there have been known various vehicle front structures intended for the protection of pedestrians. As an example, JP 2006-001358A ('Patent Publication 1') discloses a vehicle front structure comprising a plate member which extends from a lower shroud member to a position adjacent to a bottom surface of a bumper fascia so as to flick legs of a pedestrian during a frontal impact with the pedestrian. In this type of vehicle front structure, there has also been proposed an improved structure intended to provide enhanced absorbing capacity of impact energy during a frontal collision. For example, JP 2005-271810A ('Patent Publication 2') discloses a vehicle front structure comprising a beam member which bridges between right and left crush cans fixed to a front end of a subframe.

In the structure disclosed in Patent Publication 1, although the intended purpose of pedestrian protection can be effectively achieved by means of flicking legs of a pedestrian during a frontal impact with the pedestrian, it is difficult to ensure sufficient impact energy-absorbing capacity. In the structure disclosed in Patent Publication 2, although a certain level of impact energy-absorbing capacity can be ensured, it is still not enough to meet rising demand. Thus, there is a need for developing a technique of achieving the protection of pedestrians by means of enhancing impact energy-absorbing capacity.

In addition, a vehicle front structure is required to suppress serious influence from a light bump or a low-impact collision on a vehicle body, so as to achieve enhanced repairability which allows a damage by the low-impact collision to be repaired simply by replacing only a repair part (i.e., a part to be originally detachably attached to the vehicle body) without replacement of a vehicle-body component.

SUMMARY OF THE INVENTION

In view of the above technical problems and needs, it is an object of the present invention to provide a vehicle front structure capable of ensuring sufficient pedestrian protection performance by means of enhancing impact energy-absorbing capacity, while achieving enhanced repairability in the event of a low-impact collision.

In order to achieve this object, the present invention provides a vehicle front structure which comprises a bumper fascia, a lower shroud member supporting a heat exchanger from therebelow, a subframe including a subframe body and a first shock-absorbing module, and a second shock-absorbing module having a stiffness less than that of the first shock-absorbing module. In this vehicle front structure, the subframe body is formed in an approximately rectangular shape and disposed on a rear side of the lower shroud member. The first shock-absorbing module includes an energy-absorbing section and a beam member, wherein the energy-absorbing section has a configuration which extends frontwardly from respective front end regions of the subframe body located on laterally-opposite sides thereof, along respective opposite lateral surfaces of the lower shroud member, and the beam member extends laterally to bridge between respective front ends of the energy-absorbing section located on laterally-opposite sides thereof, at a height position approximately equal to or adjacent to that of a lower edge of the lower shroud member. Further, the second shock-absorbing module extends from the lower shroud member to a position adjacent to a rear surface of the bumper fascia, along and below the beam member, and has a bulging portion which covers at least a part of a front surface of the beam member.

In the vehicle front structure as mentioned above, the second shock-absorbing module makes it possible to provide enhanced impact energy-absorbing capacity to the vehicle front structure so as to ensure sufficient pedestrian protection performance while achieving enhanced repairability in the event of a low-impact collision.

These and other objects, features and advantages of the invention will become more apparent upon reading the following detailed description along with the accompanying drawings.

DESCRIPTION OF THE PREFERRED EMBODIMENTS

With reference to the accompanying drawings, an embodiment of the present invention will now be described.

Figure 1:
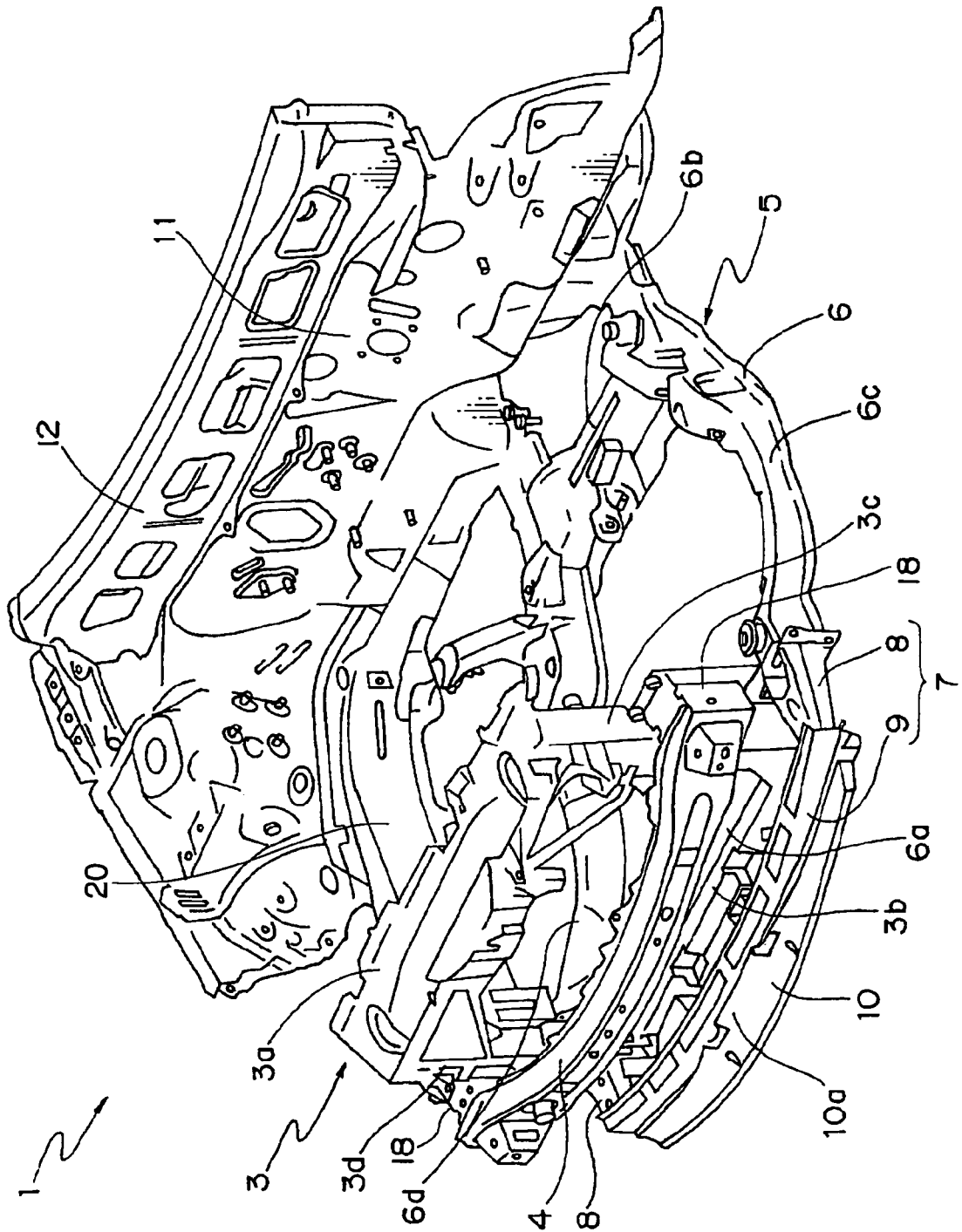
FIG. 1 is a perspective view showing a vehicle front structure according to one embodiment of the present invention, wherein a reinforcing structure and a shock-absorbing structure on an inward side relative to a bumper fascia are generally illustrated.
Figure 2:
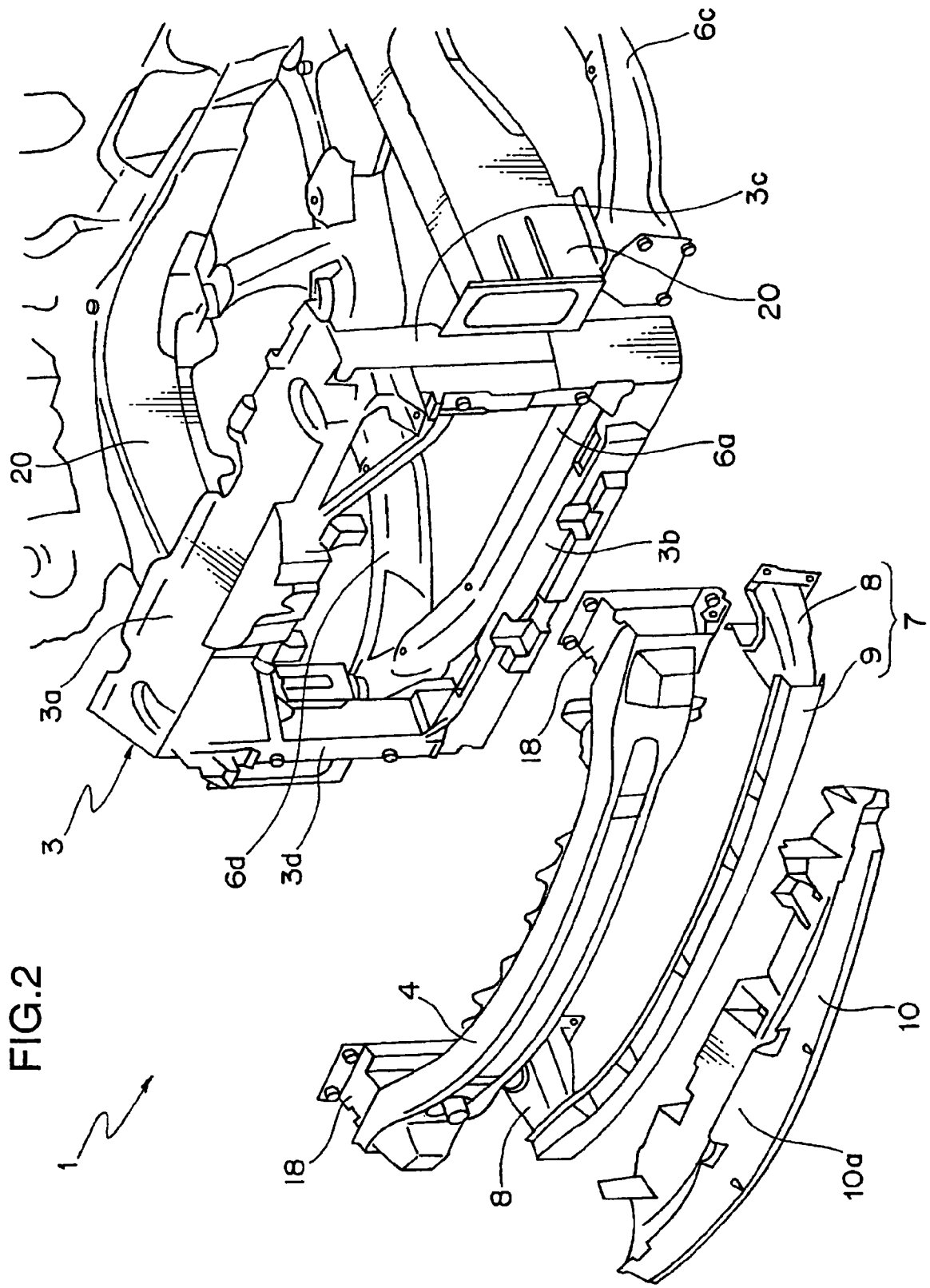
FIG. 2 is an exploded perspective view showing the vehicle front structure.
Figure 3:
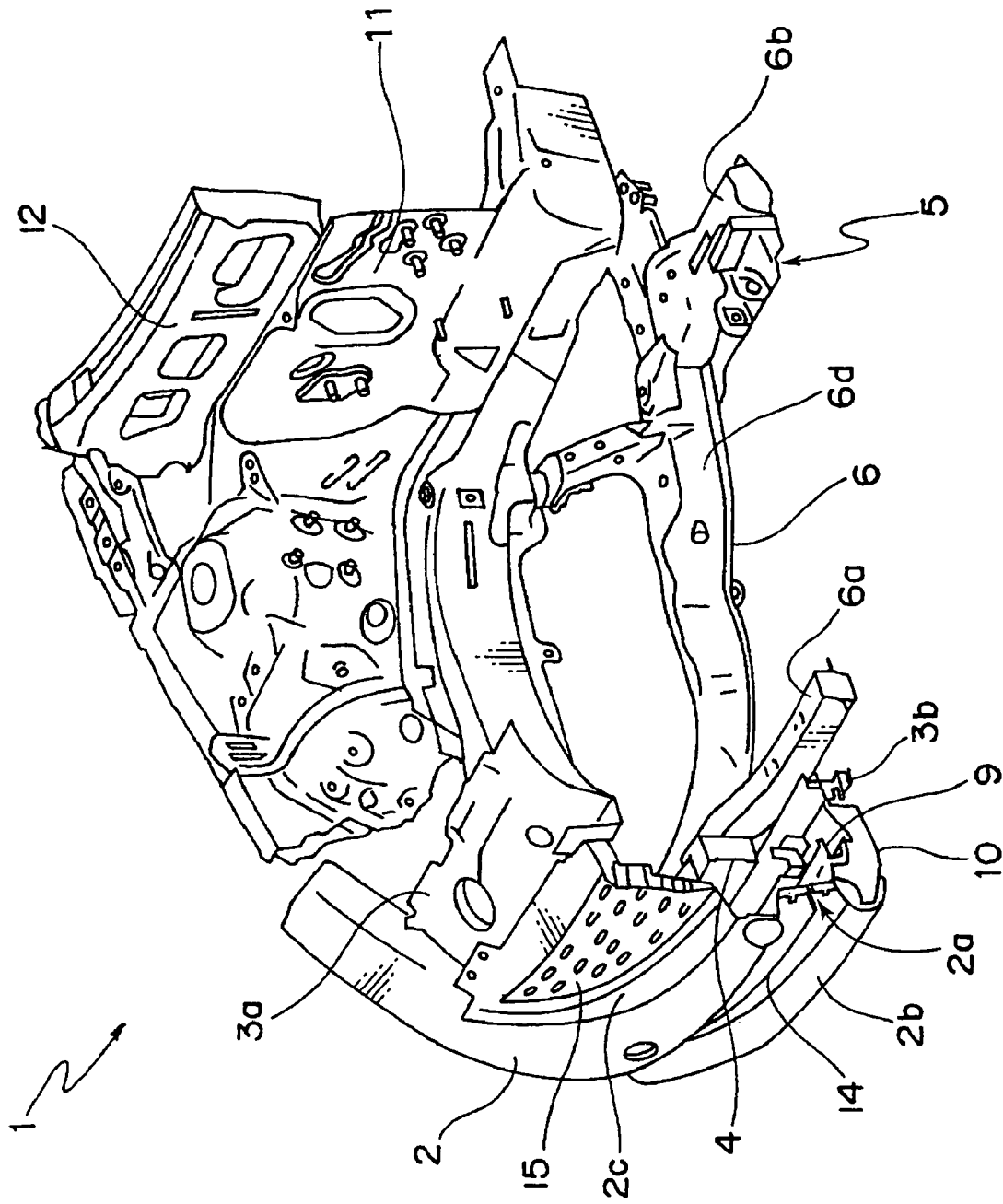
FIG. 3 is a fragmentary perspective view showing the vehicle front structure, wherein an approximately half of the vehicle front structure is cut out along a vertical plane extending in a longitudinal direction of the vehicle across a laterally central region of the vehicle.

FIG. 1 is a perspective view showing a vehicle front structure according to one embodiment of the present invention, wherein a reinforcing structure and a shock-absorbing structure on an inward side relative to a bumper fascia are generally illustrated. FIG. 2 is an exploded perspective view showing the vehicle front structure, and FIG. 3 is a fragmentary perspective view showing the vehicle front structure, wherein an approximately half of the vehicle front structure is cut out along a vertical plane extending in a longitudinal direction of the vehicle across a laterally central region of the vehicle. While the vehicle front structure of the present invention essentially comprises a bumper fascia, a vehicle-body component associated therewith, and a vehicle-body component on a left side of the vehicle (lower right side in FIG. 1), such as a left front side frame, these components are omitted in FIG. 1 only for the sake of simplicity. In FIGS. 1 to 3, a lower left side corresponds to a front of the vehicle, and an upper right side corresponds to a rear of the vehicle. As used in this specification, the terms "frontward or frontwardly" and "rearward or rearwardly" mean "frontward or frontwardly of the vehicle" and "rearward or rearwardly of the vehicle", respectively.

The vehicle front structure 1 according to this embodiment comprises a resin shroud panel 3 for supporting an in-vehicle heat exchanger from therebelow. This resin shroud panel 3 is formed as an approximately rectangular-shaped member. Specifically, the resin shroud panel 3 integrally has a first pair of arms (i.e., an upper shroud member 3a and a lower shroud member 3b) which extend in a width direction (i.e., lateral direction) of the vehicle in approximately parallel and predetermined spaced-apart relation to each other, and a second pair of arms (i.e., a pair of side arms 3c, 3d) which extend in an upward/downward direction of the vehicle in approximately parallel and predetermined spaced-apart relation to each other. A bumper reinforcement 4 is disposed on a front side of the resin shroud panel 3 to extend in the lateral direction. A pair of right and left crush cans 18, 18 are fastened to respective front ends of two front side frames 20 (see FIG. 2) disposed on laterally-opposite sides of the vehicle to extend in the longitudinal direction, and the bumper reinforcement 4 is attached to the crush cans 18, 18 in such a manner as to bridge between respective front ends of the crush cans 18, 18.

A subframe 5 having a subframe body 6 is disposed on a rear side of the resin shroud panel 3. The subframe body 6 is provided as a means to support a front suspension (not shown) and an engine unit (not shown), and formed to have an approximately rectangular shape. The subframe body 6 integrally has a first pair of arms (i.e., a front cross arm 6a and a rear cross arm 6b) which extend in the lateral direction in approximately parallel and predetermined spaced-apart relation to each other, and a second pair of arms (i.e., a pair of side arms 6c, 6d) which extend in a frontward/rearward direction (i.e., longitudinal direction) of the vehicle in approximately parallel and predetermined spaced-apart relation to each other.

A dash panel 11 serving as a partition wall between a passenger compartment and an engine compartment defined above the subframe body 6 is disposed in a vicinity of the rear cross arm 6b of the subframe body 6. A cowl panel 12 is attached to an upper end of the dash panel 11 to extend in the lateral direction.

The subframe 5 further has a pair of right and left crush cans 8, 8 and a beam member 9. The crush cans 8, 8 are attached to a front end of the subframe body 6. Specifically, each of the crush cans 8, 8 has a configuration extending frontwardly from a corresponding one of two front end regions of the subframe body 6 located on laterally-opposite sides thereof, along an extension line of a corresponding one of the side arms 6c, 6d. The beam member 9 has a configuration bridging between respective front ends of the crush cans 8, 8. Each of the crush cans 8, 8 of the subframe 5 extends frontwardly along a corresponding one of opposite lateral surfaces of the resin shroud panel 3. More specifically, each of the crush cans 8, 8 extends frontwardly along a laterally-outward side of and a vicinity of a corresponding one of opposite lateral surfaces of the lower shroud member 3b of the resin shroud panel 3. Although not specifically illustrated, the side arms 3c, 3d of the resin shroud panel 3 are fixedly fastened to a rear surface of the beam member 9. In the following description, a structure comprising the right and left crush cans 8, 8 of the subframe 5 and the beam member 9 will be referred to as "first shock-absorbing module 7". The subframe 5 including the first shock-absorbing module is a commonly-known structure. In this specification, the crush cans 8, 8 of the subframe 5 are referred to collectively as "energy-absorbing section", as described in the appended claims.

In addition to the above structure, the vehicle front structure 1 according to this embodiment includes a second shock-absorbing module 10. The second shock-absorbing module 10 has a configuration extending from a vicinity of a lower end of the resin shroud panel 3, more specifically from a front surface of the lower shroud member 3b of the resin shroud panel 3, to a position adjacent to a rear surface of the bumper fascia 2, along and below the beam member 9 of the first shock-absorbing module 7. With reference to FIGS. 4 to 9, the second shock-absorbing module 10 will be more specifically described below.

Figure 4:
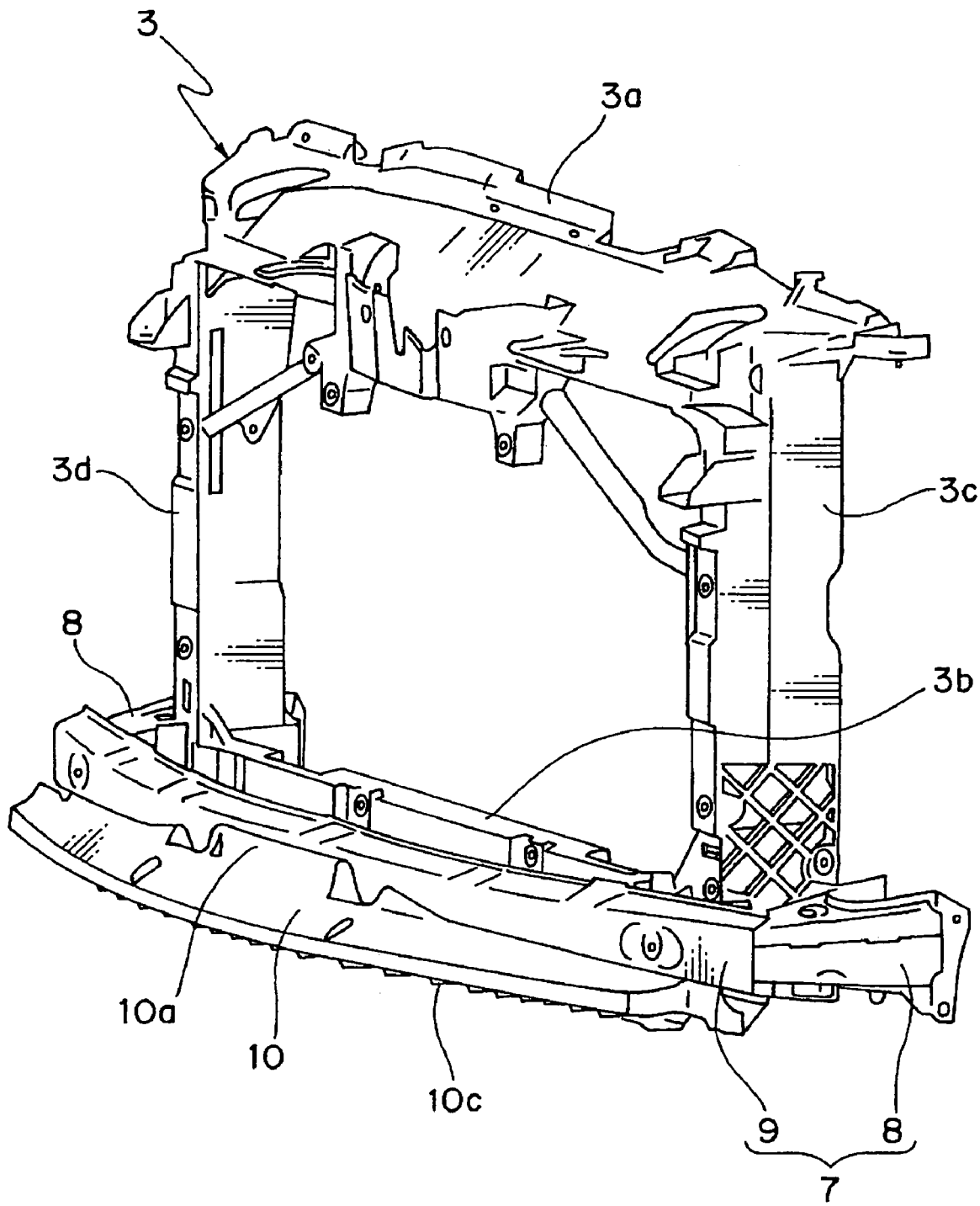
FIG. 4 is a perspective view showing a lower shroud member, a first shock-absorbing module and a second shock-absorbing module in the vehicle front structure.
Figure 5:
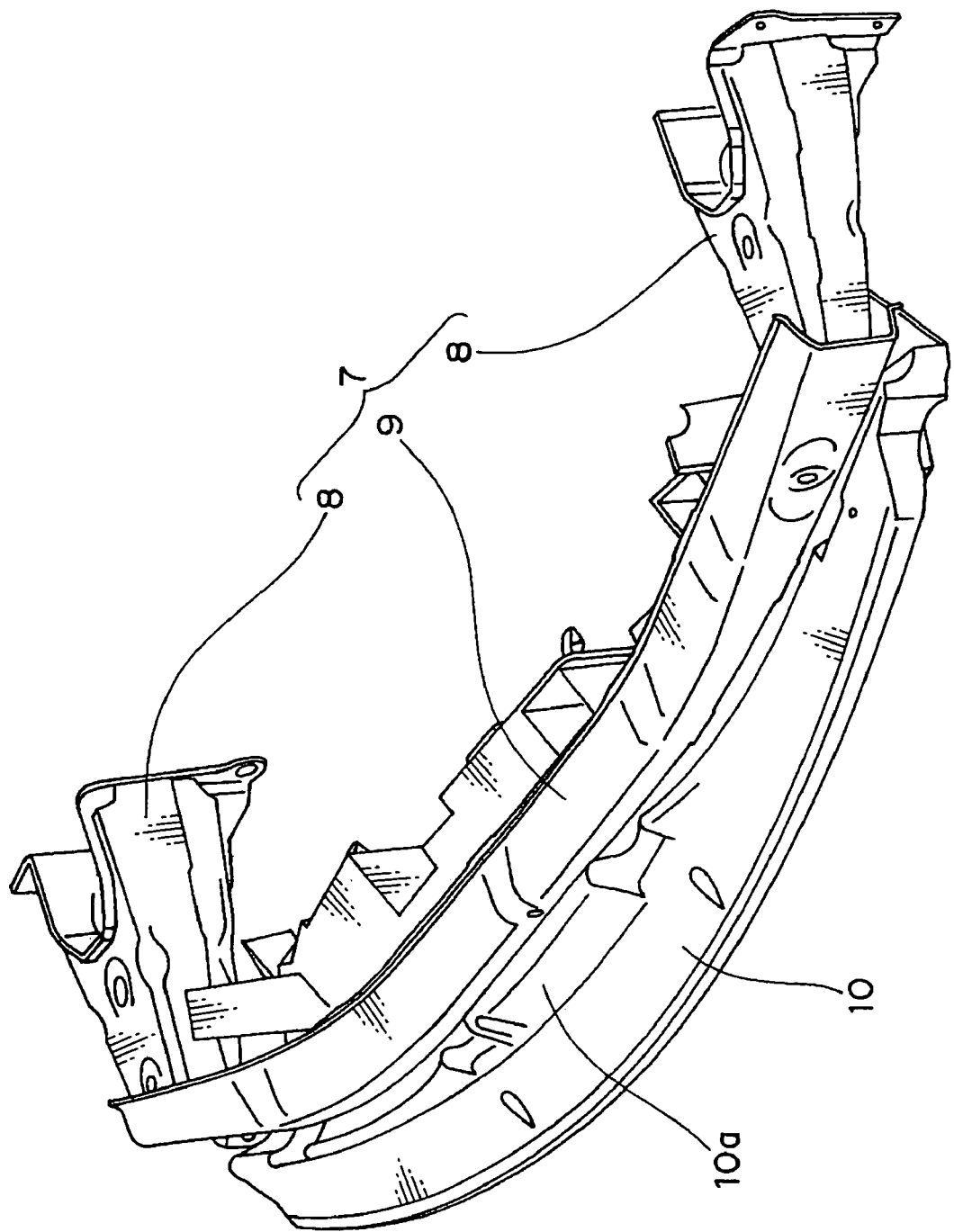
FIG. 5 is a perspective view showing the first and second shock-absorbing modules.
Figure 6:
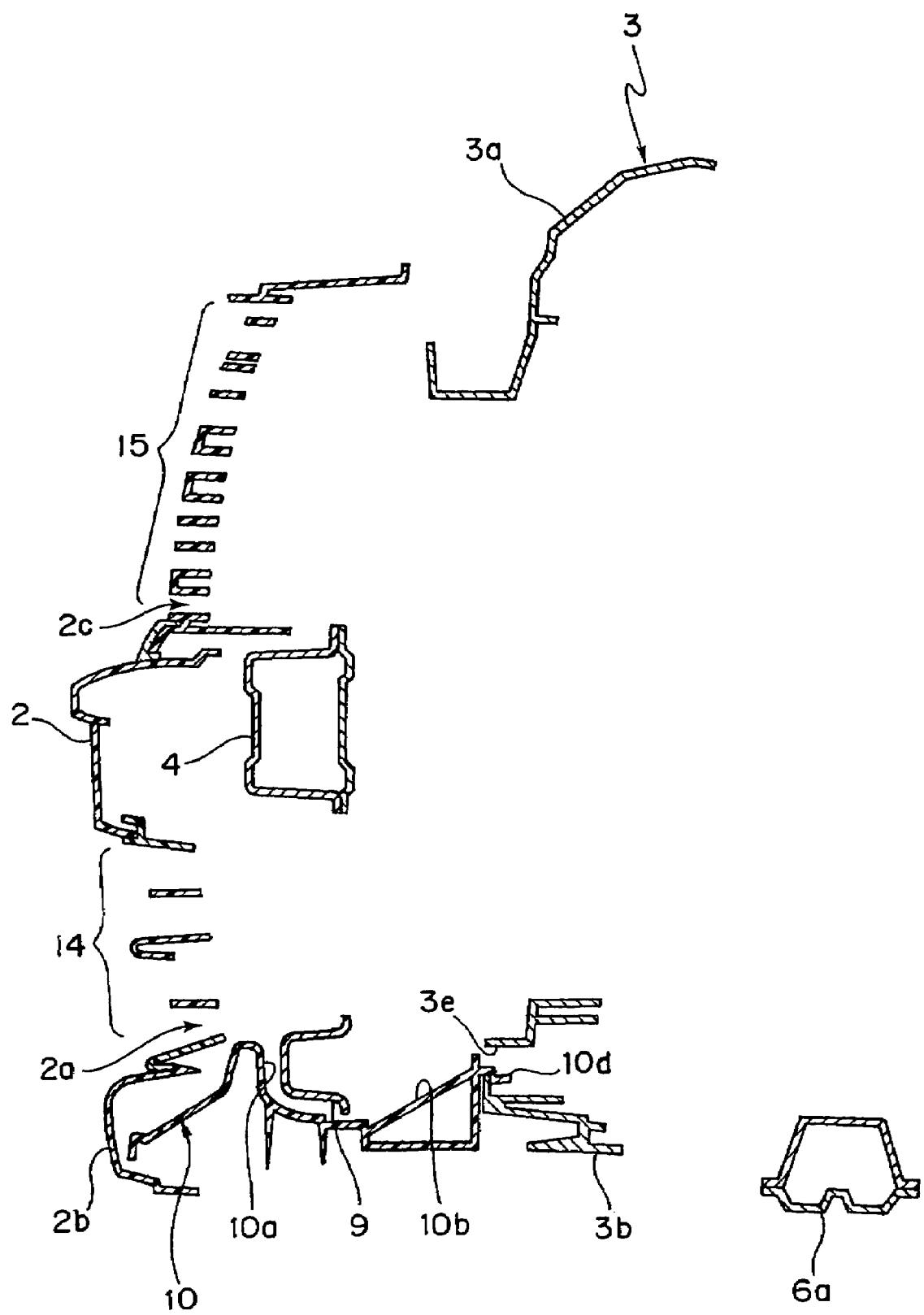
FIG. 6 is an explanatory vertical sectional view taken along a plane extending in a longitudinal direction of the vehicle across a laterally central region of the vehicle (i.e., a sectional view taken along the line VI-VI in FIG. 8).
Figure 7:
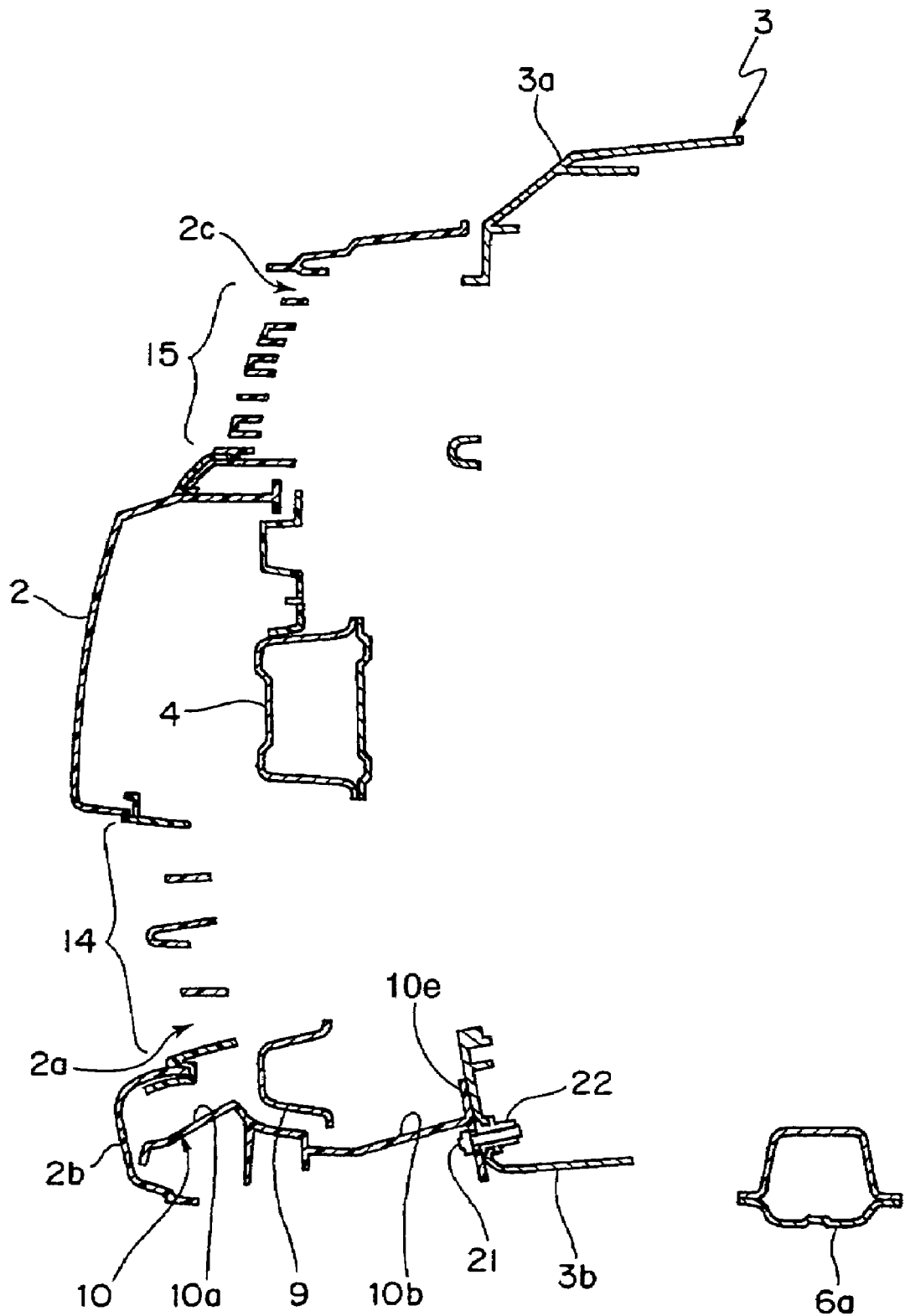
FIG. 7 is an explanatory vertical sectional view taken along a plane extending in a longitudinal direction of the vehicle across a laterally central region of the vehicle (i.e., a sectional view taken along the line VII-VII in FIG. 8).
Figure 8:
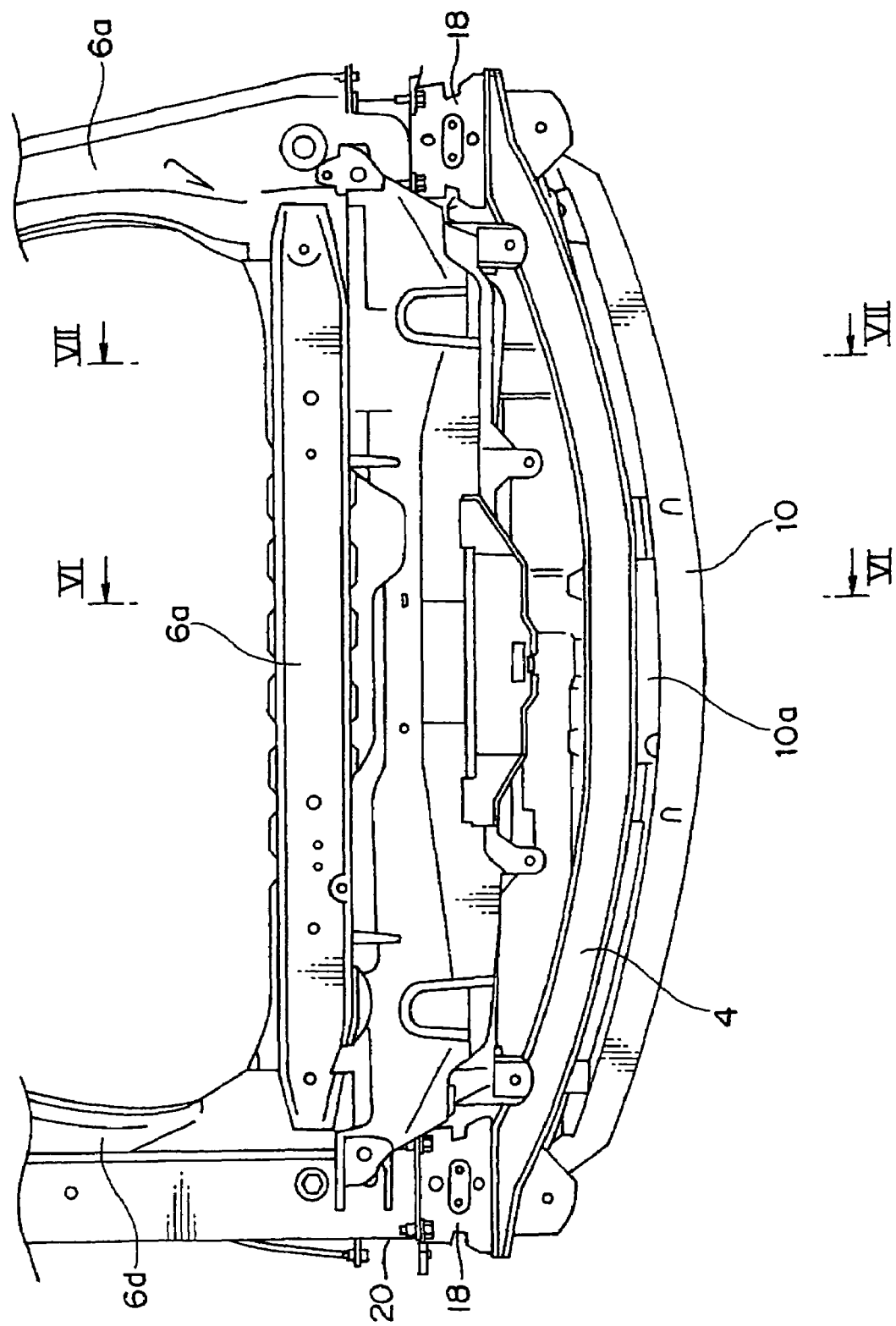
FIG. 8 is a top plan view showing the reinforcing structure and the shock-absorbing structure on an inward side relative to the bumper fascia.
Figure 9:
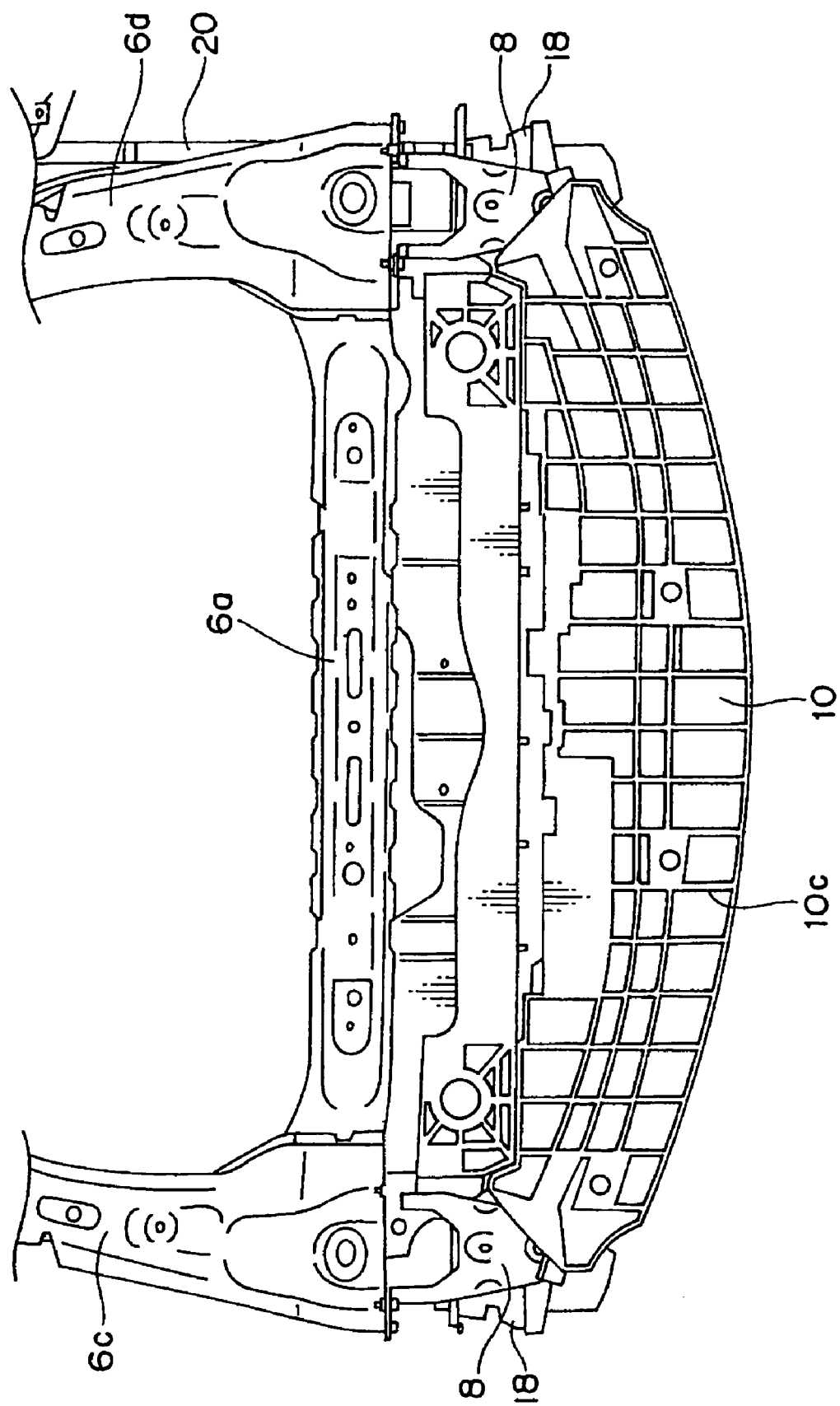
FIG. 9 is a bottom view showing the reinforcing structure and the shock-absorbing structure on an inward side relative to the bumper fascia.

FIG. 4 is a perspective view showing the resin shroud panel 3, the first shock-absorbing module 7 and the second shock-absorbing module 10 which constitute the vehicle front structure 1. FIG. 5 is a perspective view showing the first and second shock-absorbing modules 7, 10. FIG. 6 is an explanatory vertical sectional view of the vehicle front structure 1, taken along a plane extending in the longitudinal direction across a laterally central region of the vehicle (i.e., a sectional view taken along the line VI-VI in FIG. 8). FIG. 7 is an explanatory vertical sectional view of the vehicle front structure 1, taken along a plane extending in the longitudinal direction across a laterally central region of the vehicle (i.e., a sectional view taken along the line VII-VII in FIG. 8). FIGS. 8 and 9 are a top plan view and a bottom view showing the reinforcing structure and the shock-absorbing structure on an inward side relative to the bumper fascia 2. In FIGS. 8 and 9, the bumper fascia 2 and a vehicle-body component on a left side of the vehicle, such as the left front side frame, are omitted only for the sake of simplicity.

The second shock-absorbing module 10 has a stiffness less than that of the first shock-absorbing module 7. The second shock-absorbing module 10 has a bulging portion 10a which is covers a laterally-central region (having a predetermined lateral width) of a front surface of the beam member 9. This bulging portion 10a is formed to partly bend the second shock-absorbing module 10 in an inverse-U shape, and adapted to be urgedly pushed rearwardly by the bumper fascia 2 during a low-impact collision and deformed and displaced rearwardly while absorbing an impact shock (i.e., impact energy). In this manner, during the low-impact collision, the second shock-absorbing module 10 can absorb the impact shock in cooperation with the bumper reinforcement 4 and the first shock-absorbing module 7. Thus, as compared with the conventional vehicle front structure devoid of the second shock-absorbing module 10, the vehicle front structure 1 according to this embodiment can ensure higher energy-absorbing capacity. Furthermore, a damage of the vehicle due to a low-impact collision can be repaired simply by replacing only a repair part (e.g., the bumper fascia 2, the bumper reinforcement 4, the crush can 8 and/or the beam member 9), so as to provide enhanced repairability.

The second shock-absorbing module 10 also has an inclined portion 10b. This inclined portion 10b has an inclined surface which extends obliquely upwardly from below the beam member 9 toward a front surface of the lower shroud member 3b of the resin shroud panel 3. As shown in FIG. 6, the inclined portion 10b of the second shock-absorbing module 10 is located at a height position (i.e., at a position in the upward/downward direction of the vehicle) approximately opposed to the rear surface of the beam member 9.

During a low-impact collision, the bulging portion 10a urgedly pushed rearwardly by the bumper fascia 2 is displaced rearwardly while absorbing an impact shock to urgedly push the beam member 9 rearwardly. Then, the beam member 9 urgedly pushed rearwardly by the bulging portion 10a is brought into contact with the inclined portion 10b, and displaced along the inclined surface of the inclined portion 10b while applying a downward force to the second shock-absorbing module 10. Thus, when the beam member 9 is displaced by a predetermined distance, the second shock-absorbing module 10 will be dropped off. That is, while an influence from or a damage due to a frontal low-impact collision is likely to reach or extend into a vehicle-body component through the second shock-absorbing module 10, the inclined portion 10b allows the second shock-absorbing module 10 to be appropriately dropped off so as to effectively suppress the influence on the vehicle-body component due to the second shock-absorbing module 10.

As above, in this embodiment, the second shock-absorbing module 10 can provide enhanced impact energy-absorbing capacity relative to the resin shroud panel 3. In addition, the inclined portion 10b allows the second shock-absorbing module 10 to be appropriately dropped off during a low-impact collision. Thus, even if the first shock-absorbing module 7 fails to adequately absorb impact energy, a rearward displacement of the resin shroud panel 3 can be effectively suppressed.

The second shock-absorbing module 10 is attached to the front surface of the lower shroud member 3b of the resin shroud panel 3. Specifically, as shown in FIG. 6, the second shock-absorbing module 10 has an engagement piece 10d formed at a rear end of the inclined portion 10b. Correspondingly, the lower shroud member 3b has a front surface portion formed as a receiving portion 3e engageable with the engagement piece 10d. Thus, the second shock-absorbing module 10 can be temporarily held by the lower shroud member 3b through an engagement between the engagement piece 10d and the receiving portion 3e. Then, the second shock-absorbing module 10 is fastened to the lower shroud member 3b using a fastening bolt 21 and an insert nut 22. Specifically, in this embodiment, as shown in FIG. 7, the second shock-absorbing module 10 has a flange 10e which extends downwardly from the rear end of the inclined portion 10b in a direction perpendicular to the inclined surface of the inclined portion 10b. Correspondingly, the front surface portion of the lower shroud member 3b is formed as a fastening surface portion provided with an insert nut 22. The fastening bolt 21 is screwed with the insert nut 22 through the flange 10e, from a front side of the lower shroud member 3b along the inclined surface 10b, to fasten the second shock-absorbing module 10 to the lower shroud member 3b.

The engageable structure between the resin shroud panel 3 and the second shock-absorbing module 10 allows the second shock-absorbing module 10 to be temporarily held by the front surface portion during an assembling operation for the second shock-absorbing module 10, so as to facilitate the assembling operation. Further, in the operation of assembling the second shock-absorbing module 10 to the lower shroud member 3b from the front side thereof, a space can be ensured in front of the front surface of the lower shroud member 3b and in an axial direction of the insert nut 22. This makes it possible to facilitate an operation of fastening the fastening bolt 21 using a tool, such as an impact wrench, so as to achieve enhanced productivity.

A structure for and/or process of attaching the second shock-absorbing module 10 to the resin shroud panel 3 is not limited to the above manner. For example, the second shock-absorbing module 10 may be directly fastened to the resin shroud panel 3 without employing the engagement piece 10d and the receiving portion 3e.

In this embodiment, as shown in FIGS. 4 and 9, the second shock-absorbing module 10 is formed and disposed to extend laterally in a range between the right and left crush cans 8, 8 of the subframe 5. The second shock-absorbing module 10 has a plurality of ribs 10c formed on a bottom surface thereof to ensure sufficient stiffness.

As shown in FIGS. 3 and 6, the bumper fascia 2 has a first opening 2a which is formed in a vicinity of a lower end thereof to cool a heat exchanger (not shown) supported by the lower shroud member 3. This first opening 2a extends in the lateral direction to introduce external air into the engine compartment therethrough during driving of the vehicle. A grill member 14 having a plurality of laterally-extending air passages is attached to an entire region of the first opening 2a. The bumper fascia 2 has a cutout portion extending downwardly from an upper end thereof to define a second opening 2c. A grill member 15 having a plurality of air passages is attached to an entire region of the second opening 2c. The grill member 15 is integrally formed with an ornament (not shown) to allow the ornament to be located at a laterally central position of a front end surface of the vehicle.

In this embodiment, the first shock-absorbing module 7 and the second shock-absorbing module 10 are disposed in a region extending between a lower edge of the first opening 2a and a lower end of the bumper fascia 2 in the upward/downward direction of the vehicle (region indicated by the code 2b in FIGS. 3 and 6). This makes it possible to reduce a space to be occupied by the first and second shock-absorbing modules 7, 10 in the upward/downward direction of the vehicle so as to suppress deterioration in cooling performance due to installation of the second shock-absorbing module 10.

In summary, the present invention provides a vehicle front structure which comprises a bumper fascia, a lower shroud member supporting a heat exchanger from therebelow, a subframe including a subframe body and a first shock-absorbing module, and a second shock-absorbing module having a stiffness less than that of the first shock-absorbing module. In this vehicle front structure, the subframe body is formed in an approximately rectangular shape and disposed on a rear side of the lower shroud member. The first shock-absorbing module includes an energy-absorbing section and a beam member, wherein the energy-absorbing section has a configuration which extends frontwardly from respective front end regions of the subframe body located on laterally-opposite sides thereof, along respective opposite lateral surfaces of the lower shroud member, and the beam member extends laterally to bridge between respective front ends of the energy-absorbing section located on laterally-opposite sides thereof, at a height position approximately equal to or adjacent to that of a lower edge of the lower shroud member. Further, the second shock-absorbing module extends from the lower shroud member to a position adjacent to a rear surface of the bumper fascia, along and below the beam member, and has a bulging portion which covers at least a part of a front surface of the beam member.

In the vehicle front structure as mentioned above, the second shock-absorbing module makes it possible to provide enhanced impact energy-absorbing capacity to the vehicle front structure so as to ensure sufficient pedestrian protection performance while achieving enhanced repairability in the event of a low-impact collision.

Furthermore, the second shock-absorbing module may have an inclined portion with an inclined surface which extends obliquely upwardly from below the beam member toward a front surface of the lower shroud member.

In the vehicle front structure as mentioned above, the second shock-absorbing module can have further enhanced impact energy-absorbing capacity relative to the lower shroud member. In addition, this makes it possible to allow the second shock-absorbing module to be reliably dropped off during a low-impact collision, so as to suppress a rearward displacement of the lower shroud member due to deterioration in impact energy-absorbing capacity of the first shock-absorbing module.

In addition, the inclined portion of the second shock-absorbing module may have a rear end surface formed with an engagement piece engageable with the front surface of the lower shroud member.

In the aforementioned vehicle front structure, during an assembling operation for the second shock-absorbing module, the second shock-absorbing module can be temporarily held by the front surface of the lower shroud member to facilitate the assembling operation.

Moreover, in the vehicle front structure, the inclined portion of the second shock-absorbing module may have a rear end surface attached to the front surface of the lower shroud member.

In the aforementioned vehicle front structure, the second shock-absorbing module can have higher stiffness of attachment to the front surface of the lower shroud member.

Moreover, in the vehicle front structure, the second shock-absorbing module may include a flange which extends downwardly from a rear end of the inclined portion in a direction approximately perpendicular to the inclined surface, and the front surface of the lower shroud member includes a fastening surface portion provided with an insert nut, wherein the second shock-absorbing module is fastened to the lower shroud member by screwing a predetermined fastening bolt with the insert nut through the flange.

In the vehicle front structure as described in the above, during an operation of assembling the second shock-absorbing module to the lower shroud member from a front side thereof, a space for the operation can be ensured in front of the front surface of the lower shroud member and in an axial direction of the insert nut. This makes it possible to facilitate an operation of fastening the fastening bolt using a tool, such as an impact wrench, so as to achieve enhanced productivity.

Furthermore, in the vehicle front structure, the bumper fascia may have an opening which is formed in a vicinity of a lower end thereof to introduce external air into an engine compartment therethrough during driving of the vehicle, and the first shock-absorbing module and the second shock-absorbing module are disposed, in front view (frontal view of the vehicle), in a region between a lower edge of the opening and a lower end of the bumper fascia.

In the vehicle front structure set forth in the above, a space to be occupied by the first and second shock-absorbing modules in an upward/downward direction of the vehicle can be reduced to suppress deterioration in cooling performance due to installation of the second shock-absorbing module.

This application is based on Japanese Patent Application Serial No. 2006-252780, filed with Japan Patent Office on Sep. 19, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle front structure comprising:
   a bumper fascia;
   a lower shroud member supporting a heat exchanger from therebelow;
   a subframe including a subframe body and a first shock-absorbing module; and
   a second shock-absorbing module having a stiffness less than that of said first shock-absorbing module,
   wherein:
   said subframe body is formed in an approximately rectangular shape and disposed on a rear side of said lower shroud member;
   said first shock-absorbing module includes an energy-absorbing section and a beam member, said energy-absorbing section having a configuration which extends frontwardly from respective front end regions of said subframe body located on laterally-opposite sides thereof, along respective opposite lateral surfaces of said lower shroud member, said beam member extending laterally to bridge between respective front ends of said energy-absorbing section located on laterally-opposite sides thereof, at a height position approximately equal to or adjacent to that of a lower edge of said lower shroud member;
   said second shock-absorbing module extends from said lower shroud member to a position adjacent to a rear surface of said bumper fascia, along and below said beam member, said second shock-absorbing module having a bulging portion which covers at least a part of a front surface of said beam member.

2. The vehicle front structure as defined in claim 1, wherein said second shock-absorbing module has an inclined portion with an inclined surface which extends obliquely upwardly from below said beam member toward a front surface of said lower shroud member.

3. The vehicle front structure as defined in claim 2, wherein said inclined portion of said second shock-absorbing module has a rear end surface formed with an engagement piece engageable with the front surface of said lower shroud member.

4. The vehicle front structure as defined in claim 2, wherein said inclined portion of said second shock-absorbing module has a rear end surface attached to the front surface of said lower shroud member.

5. The vehicle front structure as defined in claim 2, wherein:
   said second shock-absorbing module includes a flange which extends downwardly from a rear end of said inclined portion in a direction approximately perpendicular to said inclined surface; and
   said front surface of said lower shroud member includes a fastening surface portion provided with an insert nut,
   wherein said second shock-absorbing module is fastened to said lower shroud member by screwing a predetermined fastening bolt with said insert nut through said flange.

6. The vehicle front structure as defined in claim 1, wherein:
   said bumper fascia has an opening which is formed in a vicinity of a lower end thereof to introduce external air into an engine compartment therethrough during driving of the vehicle; and
   said first shock-absorbing module and said second shock-absorbing module are disposed, in a front view, in a region between a lower edge of said opening and a lower end of said bumper fascia.

* * * * *